(12) United States Patent
Yun

(10) Patent No.: US 10,877,474 B2
(45) Date of Patent: Dec. 29, 2020

(54) AUTONOMOUS DRIVING CONTROL APPARATUS, VEHICLE HAVING THE APPARATUS, AND METHOD OF CONTROLLING THE APPARATUS

(71) Applicants: Hyundai Motor Company, Seoul (KR); Kia Motors Corporation, Seoul (KR)

(72) Inventor: HyunChul Yun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 116 days.

(21) Appl. No.: 16/194,469

(22) Filed: Nov. 19, 2018

(65) Prior Publication Data

US 2020/0117188 A1    Apr. 16, 2020

(30) Foreign Application Priority Data

Oct. 15, 2018   (KR) ......................... 10-2018-0122588

(51) Int. Cl.
| | |
|---|---|
| *G05D 1/00* | (2006.01) |
| *G05D 1/02* | (2020.01) |
| *G07C 5/08* | (2006.01) |
| *B60T 7/12* | (2006.01) |

(52) U.S. Cl.
CPC ......... *G05D 1/0061* (2013.01); *G05D 1/0088* (2013.01); *G05D 1/0276* (2013.01); *G07C 5/0808* (2013.01); *B60T 7/12* (2013.01); *G05D 2201/0213* (2013.01)

(58) Field of Classification Search
CPC .. G05D 1/0061; G05D 1/0276; G05D 1/0088; G05D 2201/0213; G07C 5/0808; G07C 5/008; B60T 7/12; B60T 2270/406; B60T 2201/022; B60T 7/22; B60W 60/00; B60W 10/06; B60W 10/18; B60W 10/10; B60W 10/20; B60W 30/00; B60W 2710/06; B60W 2710/10; B60W 2710/18; B60W 2710/20; B60W 2710/30
USPC .......................................................... 701/24
See application file for complete search history.

(56) References Cited

U.S. PATENT DOCUMENTS

2020/0110406 A1*  4/2020  Krishnamurthy .... G05D 1/0061
2020/0249693 A1*  8/2020  Hamilton ............ B60R 16/0231

* cited by examiner

*Primary Examiner* — Brian P Sweeney
(74) *Attorney, Agent, or Firm* — Mintz Levin Cohn Ferris Glovsky and Popeo, P.C.; Peter F. Corless

(57) ABSTRACT

An autonomous driving control apparatus for a vehicle may include: a communication control unit (CCU) configured to communicate with at least one electronic control unit (ECU) included in the vehicle and an external server; and a controller configured to diagnose the at least one ECU, to transmit a result of the diagnosis of the at least one ECU to the external server through the CCU, to receive alternative function information, indicating one or more alternative functions, generated by the external server based on the result of the diagnosis of the at least one ECU, and to perform autonomous driving control of the vehicle using the one or more alternative functions.

22 Claims, 8 Drawing Sheets

FIG. 4

| | | EXTERNAL LAMP CONTROLLER | | | |
|---|---|---|---|---|---|
| | | BRAKE LAMP | TAIL LAMP | DRL | CORNERING LAMP |
| VEHICLE | DIAGNOSIS | NORMAL | ABNORMAL (DISCONNECTION OF LAMP) | NORMAL | NORMAL |
| | WHETHER AUTONOMOUS DRIVING IS POSSIBLE | POSSIBLE | REQUEST FOR SETTING ALTERNATIVE FUNCTION | REQUEST FOR SETTING ALTERNATIVE FUNCTION | REQUEST FOR SETTING ALTERNATIVE FUNCTION |
| SERVER | WHETHER ALTERNATIVE FUNCTION IS PERFORMABLE | — | PRIORITY 1: FLASHER LAMP PRIORITY 2: FOG LAMP | PRIORITY 1: CONTROL HEAD LAMP UPWARD PRIORITY 2: FOG LAMP | NOT REPLACEABLE BUT AUTONOMOUS DRIVING IS POSSIBLE |

FIG. 5

| DIVISION | | BRAKE CONTROLLER | |
|---|---|---|---|
| | | BRAKE CONTROL | SLIP CONTROL |
| VEHICLE | DIAGNOSIS | ABNORMAL | NORMAL |
| | WHETHER AUTONOMOUS DRIVING IS POSSIBLE | REQUEST FOR SETTING ALTERNATIVE FUNCTION | POSSIBLE |
| SERVER | WHETHER ALTERNATIVE FUNCTION IS PERFORMABLE | PRIORITY 1: PARKING BRAKE<br>PRIORITY 2: ACCELERATION<br>PRIORITY 3: ENGINE CONTROL | - |

AUTONOMOUS DRIVING CONTROL APPARATUS, VEHICLE HAVING THE APPARATUS, AND METHOD OF CONTROLLING THE APPARATUS

CROSS-REFERENCE TO RELATED APPLICATION

This application claims the benefit of priority to Korean Patent Application No. 10-2018-0122588, filed on Oct. 15, 2018 in the Korean Intellectual Property Office, the disclosure of which is incorporated herein by reference in its entirety.

BACKGROUND

1. Technical Field

Embodiments of the present disclosure relate to an autonomous driving control apparatus, a vehicle including the same, and a method of controlling the same, and more particularly, to an autonomous driving control apparatus which performs autonomous driving control without driver intervention by autonomously diagnosing each electronic control unit (ECU) of a vehicle.

2. Description of the Related Art

Modern vehicles may perform a variety of functions intended to enhance user convenience relating to audio, video, navigation, air-conditioning, seat control, lighting control, and the like. In such a vehicle, an audio/video/navigation (AVN) system is often provided to integrate functions relating to navigation, audio, and video.

In addition, many modern vehicles include autonomous driving control capabilities which involve autonomously driving the vehicle to a destination using automated driving functions relating to navigation, lane recognition, obstacle recognition, and the like.

Autonomous driving control is generally classified into five stages. A first stage involves controlling the vehicle using a driver assisting function and automatic brake and speed control. A second stage involves partial autonomous driving in which two or more automation functions are performed at the same time while a driver drives a vehicle. A third stage involves conditional autonomous driving in which limited autonomous driving performed by artificial intelligence in the vehicle is possible, but driver intervention is necessary in particular situations. A fourth stage involves high-level autonomous driving in which intervention or monitoring of the driver is unnecessary in particular environments. A fifth stage involves a complete automation stage win which driver intervention is unnecessary in any environment.

The third, fourth, and fifth stages of autonomous driving involve cases in which it is necessary for the vehicle to autonomously determine a state without driver intervention. However, safe autonomous driving is possible only when a plurality of ECUs present in the vehicle are operating in a normal state.

SUMMARY

It is an aspect of the present disclosure to determine whether autonomous driving without driver intervention is possible by autonomously determining states of a plurality of electronic control units (ECUs) present in a vehicle ("plurality of vehicle ECUs").

It is another aspect of the present disclosure to provide a vehicle capable of autonomous driving without driver intervention by autonomously determining states of the plurality of vehicle ECUs.

It is another aspect of the present disclosure to provide a vehicle capable of autonomous driving without driver intervention by autonomously diagnosing the plurality of vehicle ECUs and performing an alternative control on the basis of diagnostic information.

It is another aspect of the present disclosure to provide a vehicle capable of safely controlling autonomous driving without driver intervention.

Additional aspects of the present disclosure will be set forth in part in the description which follows and, in part, will be apparent from the description, or may be learned by practice of the present disclosure.

In accordance with embodiments of the present disclosure, an autonomous driving control apparatus for a vehicle may include: a communication control unit (CCU) configured to communicate with at least one electronic control unit (ECU) included in the vehicle and an external server; and a controller configured to diagnose the at least one ECU, to transmit a result of the diagnosis of the at least one ECU to the external server through the CCU, to receive alternative function information, indicating one or more alternative functions, generated by the external server based on the result of the diagnosis of the at least one ECU, and to perform autonomous driving control of the vehicle using the one or more alternative functions.

The controller may determine whether autonomous driving of the at least one ECU is possible before the vehicle is driven, and to determine whether the autonomous driving of the at least one ECU continues while the vehicle is driven.

When the at least one ECU is diagnosed to be abnormal before the vehicle is driven, the controller may determine whether autonomous driving of the vehicle is possible using a function included in the one or more alternative functions.

When the at least one ECU is diagnosed to be abnormal before the vehicle is driven and a compulsory function of the at least one ECU is determined to be abnormal, the controller may request an operation in a driving mode selected by a driver of the vehicle.

When the at least one ECU is diagnosed to be abnormal while the vehicle is driven, the controller may determine whether autonomous driving of the vehicle is possible using a function included in the one or more alternative functions.

The at least one ECU may include a driving controller configured to control a driving operation of the vehicle or a brake controller configured to control a braking operation of the vehicle.

The controller may determine whether a preset target performance is satisfied while the autonomous driving of the vehicle is performed using the function included in the one or more alternative functions, and request operation of the vehicle in a driving mode selected by a driver of the vehicle when the preset target performance is not satisfied.

When the alternative function information includes a plurality of prioritized alternative functions, the controller may sequentially apply the plurality of prioritized alternative functions to satisfy a preset target performance.

Furthermore, in accordance with embodiments of the present disclosure, a vehicle may include: a communication control unit (CCU) configured to communicate with at least one electronic control unit (ECU) included in the vehicle and an external server; and an autonomous driving control apparatus configured to diagnose the at least one ECU, to transmit a result of the diagnosis of the at least one ECU to the external server through the CCU, to receive alternative function information, indicating one or more alternative functions, generated by the external server based on the result of the diagnosis of the at least one ECU, and to perform autonomous driving control of the vehicle using the one or more alternative functions.

The autonomous driving control apparatus may determine whether autonomous driving of the at least one ECU is possible before the vehicle is driven, and to determine whether the autonomous driving of the at least one ECU continues while the vehicle is driven.

When the at least one ECU is diagnosed to be abnormal before the vehicle is driven, the autonomous driving control apparatus may determine whether autonomous driving of the vehicle is possible using a function included in the one or more alternative functions.

When the at least one ECU is diagnosed to be abnormal before the vehicle is driven and a compulsory function of the at least one ECU is determined to be abnormal, the autonomous driving control apparatus may request an operation in a driving mode selected by a driver of the vehicle.

When the at least one ECU is diagnosed to be abnormal while the vehicle is driven, the autonomous driving control apparatus may determine whether autonomous driving of the vehicle is possible using a function included in the one or more alternative functions.

The at least one ECU may include a driving controller configured to control a driving operation of the vehicle or a brake controller configured to control a braking operation of the vehicle.

The autonomous driving control apparatus may determine whether a preset target performance is satisfied while the autonomous driving of the vehicle is performed using the function included in the one or more alternative functions, and request operation of the vehicle in a driving mode selected by a driver of the vehicle when the preset target performance is not satisfied.

When the alternative function information includes a plurality of prioritized alternative functions, the autonomous driving control apparatus may sequentially apply the plurality of prioritized alternative functions to satisfy a preset target performance.

Furthermore, in accordance with embodiments of the present disclosure, a method of controlling a vehicle may include: establishing, by a communication control unit (CCU) of the vehicle, a communication session with at least one electronic control unit (ECU) included in the vehicle and an external server; diagnosing, by a controller of the vehicle, the at least one ECU; transmitting, via the CCU, a result of the diagnosis of the at least one ECU to the external server; receiving, via the CCU, alternative function information, indicating one or more alternative functions, generated by the external server based on the result of the diagnosis of the at least one ECU; and performing, by the controller, autonomous driving control of the vehicle using the one or more alternative functions.

The diagnosing of the at least one ECU may include determining, by the controller, whether autonomous driving of the at least one ECU is possible before the vehicle is driven; and determining, by the controller, whether the autonomous driving of the at least one ECU continues while the vehicle is driven.

The method may further include, when the at least one ECU is diagnosed to be abnormal before the vehicle is driven and a compulsory function of the at least one ECU is determined to be abnormal, requesting, by the controller, an operation in a driving mode selected by a driver of the vehicle.

The method may further include, when the at least one ECU is diagnosed to be abnormal while the vehicle is driven, determining, by the controller, whether autonomous driving of the vehicle is possible using a function included in the one or more alternative functions.

The method may further include determining, by the controller, whether a preset target performance is satisfied while the autonomous driving of the vehicle is performed using the function included in the one or more alternative functions; and requesting, by the controller, operation of the vehicle in a driving mode selected by a driver of the vehicle when the preset target performance is not satisfied.

The method may further include, when the alternative function information includes a plurality of prioritized alternative functions, sequentially applying, by the controller, the plurality of prioritized alternative functions to satisfy a preset target performance.

BRIEF DESCRIPTION OF THE DRAWINGS

These and/or other aspects of the present disclosure will become apparent and more readily appreciated from the following description of the embodiments, taken in conjunction with the accompanying drawings of which:

FIGS. 4 and 5 are views illustrating a method of determining, by the autonomous driving control apparatus in accordance with embodiments, whether an alternative function is performed by one electronic control unit (ECU);

Figure 1:
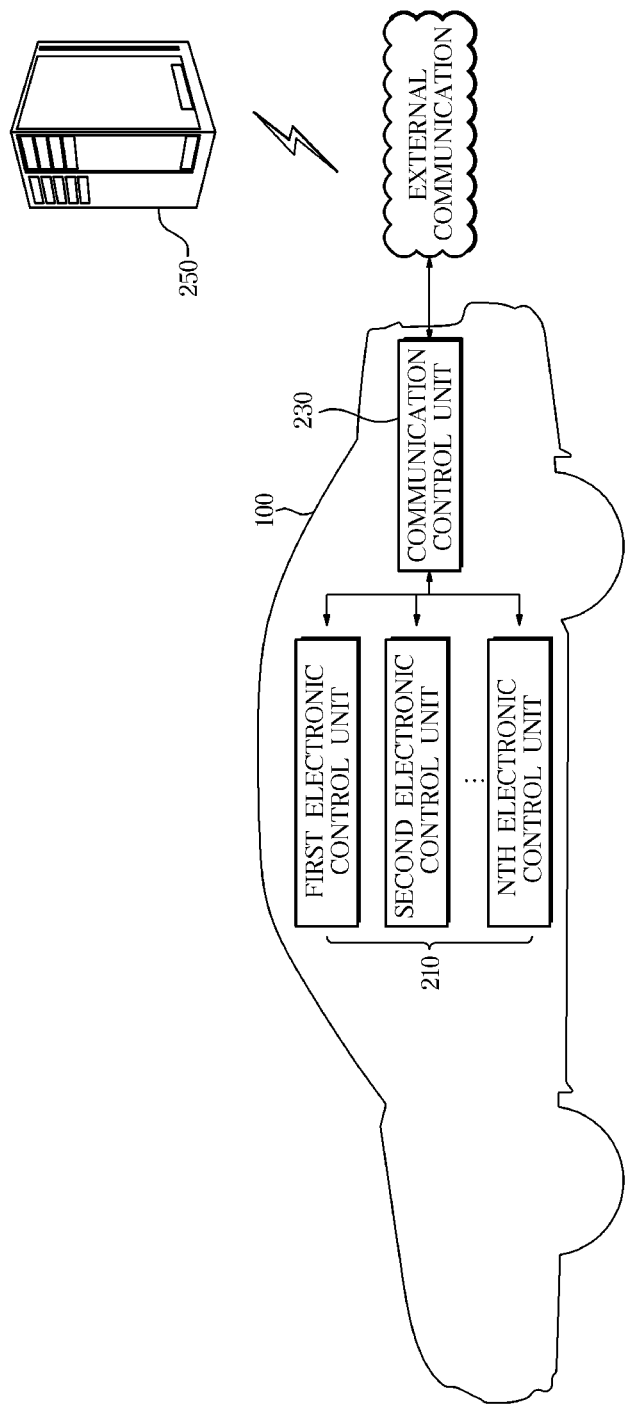
FIG. 1 is an internal configuration diagram of a vehicle in which an autonomous driving control apparatus in accordance with embodiments of the present disclosure is provided.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, the present disclosure will be described in detail with reference to the attached drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Figure 2:
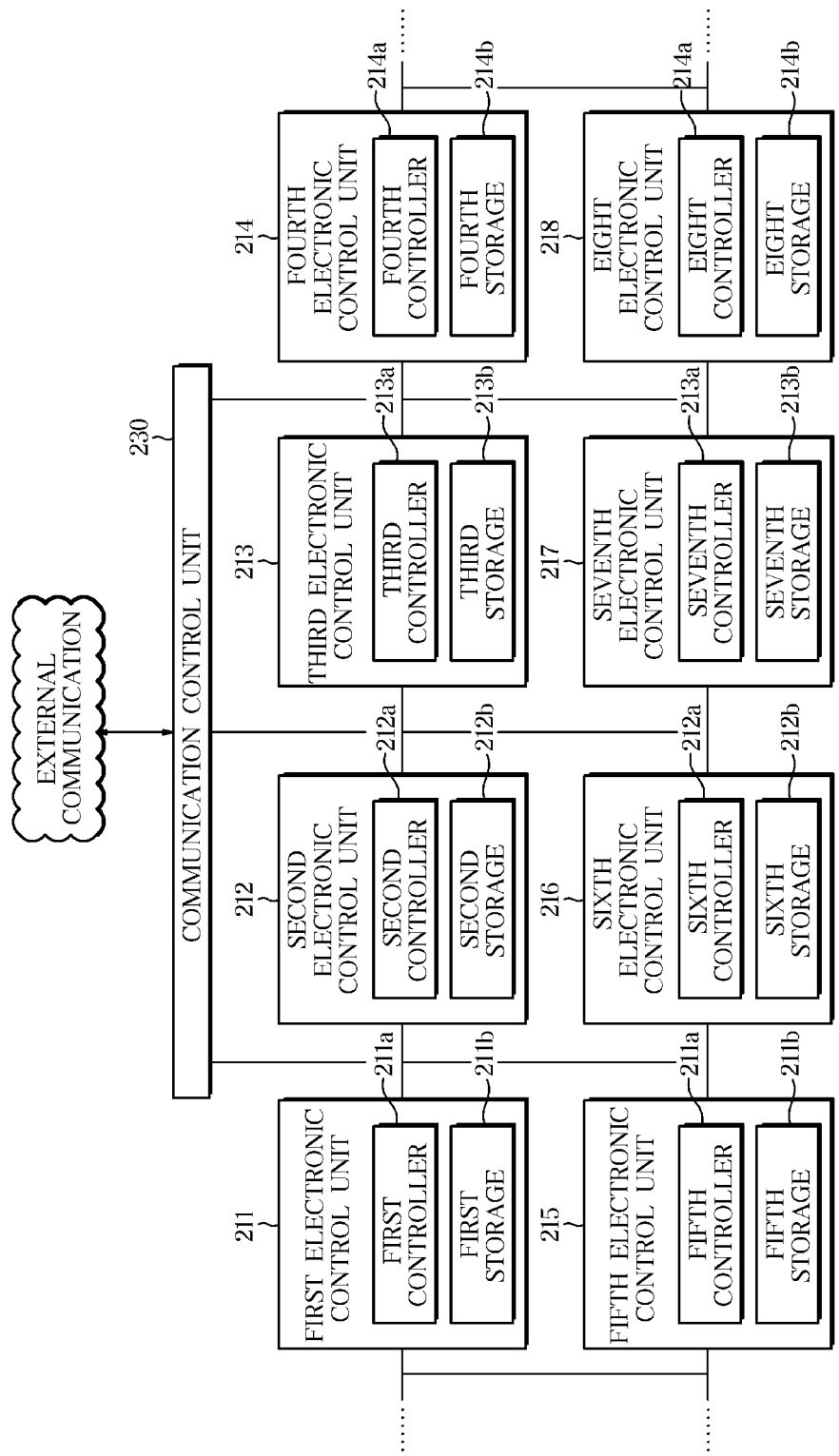
FIG. 2 is a detailed internal configuration diagram of the vehicle in which the autonomous driving control apparatus in accordance with embodiments of the present disclosure is provided.

Referring now to the presently disclosed embodiments, FIG. 1 is an internal configuration diagram of a vehicle in which an autonomous driving control apparatus in accordance with embodiments of the present disclosure is provided, and FIG. 2 is a detailed internal configuration diagram of the vehicle in which the autonomous driving control apparatus in accordance with embodiments of the present disclosure is provided.

A vehicle 100 includes a plurality of electronic control units (ECU) 210 and a communication control unit (CCU) 230.

Each of the plurality of ECUs 210 is electrically, mechanically, and communicatively connected to at least one of a plurality of devices provided in a vehicle and controls an operation of the at least one device on the basis of any one function-performing command.

Here, the plurality of devices may include an acquisition device which acquires information necessary for performing at least one function and an output device which performs at least one function.

For example, the acquisition device may include a variety of detectors and an image acquirer. The output device may include a speaker, a display, a fan and a compressor of an air-conditioning system, hot wires, a fan of a ventilation device, an engine and a motor of a power unit, a motor of a steering apparatus, a motor and a valve of a brake, an opening or closing device of a door or a tail gate, lamps, a vehicular terminal (audio/video/navigation (AVN)), and the like. An example of each of the ECUs will be described in detail with reference to FIG. 3.

The plurality of ECUs may perform communication with the acquisition device and the output device by using at least one of controller area network (CAN) communication, Ethernet, low-voltage differential signaling (LVDS) communication, and local interconnect network (LIN) communication.

The plurality of ECUs 210 may determine whether performing of a function is necessary on the basis of information acquired by the acquisition device, may control an operation of the output device which performs the corresponding function when it is determined that performing of the function is necessary, and may control an operation amount on the basis of the acquired information.

The plurality of ECUs 210 may control the operation of the output device, which performs the corresponding function, on the basis of a function performing command input through an input portion and may check a set amount corresponding to information input through the input portion and control the operation of the output device, which performs the corresponding function, on the basis of the checked set amount.

Each of the ECUs 210 may independently control any one function or may control any one function while being in connection with another ECU.

For example, an ECU of a collision preventing device may allow a speaker to output an alarm sound with respect to a collision with an obstacle when a distance from the object detected by a distance detector is within a range of a reference distance.

The ECU 210 of the autonomous driving control apparatus, in connection with an ECU of the vehicular terminal, an ECU of the image acquirer, and an ECU of the collision preventing device, may receive navigation information, road image information, and information on a distance from an obstacle and may control the power unit, the brake, and the steering apparatus by using the received items of information so as to perform autonomous driving.

The CCU 230 is electrically, mechanically, and communicatively connected to the plurality of ECUs and performs communication with each of the plurality of ECUs.

That is, the CCU 230 may directly perform communication with the plurality of ECUs provided in a vehicle, may perform communication with an external server, and may perform communication with an external terminal through an interface.

Here, the CCU may perform communication with the plurality of ECUs 210 through gigabit Ethernet, may perform communication with a server through an antenna (not shown) and radio frequency (RF) communications, and may perform communication with an interface through CAN communication.

Also, the CCU 230 may perform communication with a server 250 through wireless communications. Here, wireless communications between the CCU 230 and the server 250 may be performed through a variety of wireless communication methods such as global system for mobile communication (GSM), code division multiple access (CDMA), wideband code division multiple access (WCDMA), universal mobile telecommunications system (UMTS), time division multiple access (TDMA), long term evolution (LTE), and the like in addition to a wireless fidelity (WiFi) module and a wireless broadband (WiBro) module.

The CCU 230 transmits and receives information and data with the plurality of ECUs and may be formed as an ECU.

Accordingly, control configurations of the plurality of ECUs 210 and the CCU 230 of the vehicle 100 will be described in detail with reference to FIG. 2.

Here, FIG. 2 is a detailed internal configuration diagram of the vehicle in which the ECU 210 in accordance with embodiments is provided and which is shown in FIG. 1. Although a first ECU 211 to an eighth ECU 218 are shown in FIG. 2, the vehicle 100 may include a larger number N of ECUs 210.

As shown in FIG. 2, the same components which the plurality of ECUs have in common will be described. In addition, since the plurality of ECUs 210 include the same components, only a control component of the first ECU 211 will be described.

Here, the first ECU 211 may be an autonomous driving control apparatus and may be an autonomous driving control apparatus which performs a highway driving assist (HDA). The HDA will be described as an example.

As shown in FIG. 2, the first ECU 211 may include a first controller 211a and a first storage 211b.

The first controller 211a controls an operation of the first ECU 211 overall. When the first ECU 211 is an autonomous driving control apparatus, the first controller 211a may connectively operate by performing communications with an ECU which controls the image acquirer, an ECU which controls the distance detector, and an ECU which controls the vehicular terminal.

The first controller 211a receives image information, distance information from an obstacle, position information, map information, and destination information, generates a control signal with respect to autonomous driving on the basis of received information, generates control signals for controlling a variety of units driven during autonomous driving, controls such that the generated control signals are transmitted to the variety of units, and controls communications with a domain control apparatus 221 and other ECUs for connective operations.

Here, the variety of units driven during autonomous driving includes a power unit, a brake unit, a steering unit and may include a vehicular terminal which outputs navigation information and driving information.

The first controller 211a manages a built-in memory and, when new data related to an autonomous driving control function is received, stores the received new data in the built-in memory or controls transmission of the received new data to store the received new data in a memory provided in another ECU.

Here, the first controller 211a may include a software diagnosis manager capable of diagnosing a function of the first ECU 211 on the basis of communications in the vehicle.

For example, when the first ECU 211 is the autonomous driving control apparatus, the first controller 211a may autonomously determine whether autonomous driving is possible, whether autonomous driving continues, and whether an alternative function is performed under an autonomous driving environment by utilizing the diagnosis information from the server 250. The alternative function may be included among one or more alternative functions indicated by alternative function information generated by the server 250 based on a result of a diagnosis of the ECU.

Next, the first storage 211b stores software for controlling autonomous driving and stores software for managing the memory.

The first storage 211b may store data for controlling autonomous driving and may store data for managing the memory.

That is, a software storage area of the first storage 211b may be an area in which the software for controlling autonomous driving and the software for managing the memory are stored.

Also, a data storage area of the first storage 211b may be an area which stores data necessary for controlling autonomous driving and managing the memory or may be an area in which the new data is stored.

As an example of data necessary for controlling autonomous driving, image data for recognizing an obstacle, image data for recognizing a lane, distance data for generating an alarm in accordance with an approach to an obstacle, image data for recognizing objects such as traffic lights and signs on the road, and the like may be included.

The first storage 211b may store new data under the control of the first controller 211a and may delete prestored data under the control of the first controller 211a.

A residual quantity of information of the first storage 211b may be a quantity of an area capable of additionally storing data in the data storage area.

The first storage 211b includes a readable-writeable non-volatile memory. The first memory a12 may include a flash memory.

In addition, the first storage 211b may be an erasable programmable read-only memory (EPROM) or an electrically erasable programmable read-only memory (EEPROM).

The first ECU 211 may further include a first communication unit (not shown) which performs communications with the CCU 230 in addition to the first controller 211a and the first storage 211b and may perform communications in a vehicle.

As described above, the ECU 210 may include a microprocessor, a memory, and a communication unit which perform operations corresponding to devices or functions which are objects to be controlled.

The controllers of the plurality of ECUs may include different operation logics and control logics according to devices or functions to be controlled, and the memories of the plurality of ECUs may include different stored software and data according to devices or functions to be controlled.

Also, the communicators of the plurality of ECUs may include different communication methods according to devices to be controlled and may include a plurality of communication methods.

That is, according to devices of the plurality of ECUs, the operation logics and control logics of the controllers, the software and data stored in the memories, voltages adjusted by power suppliers, and hardware drives provided in drivers, communication methods of the communicators, and the like may differ from one another.

Figure 3:
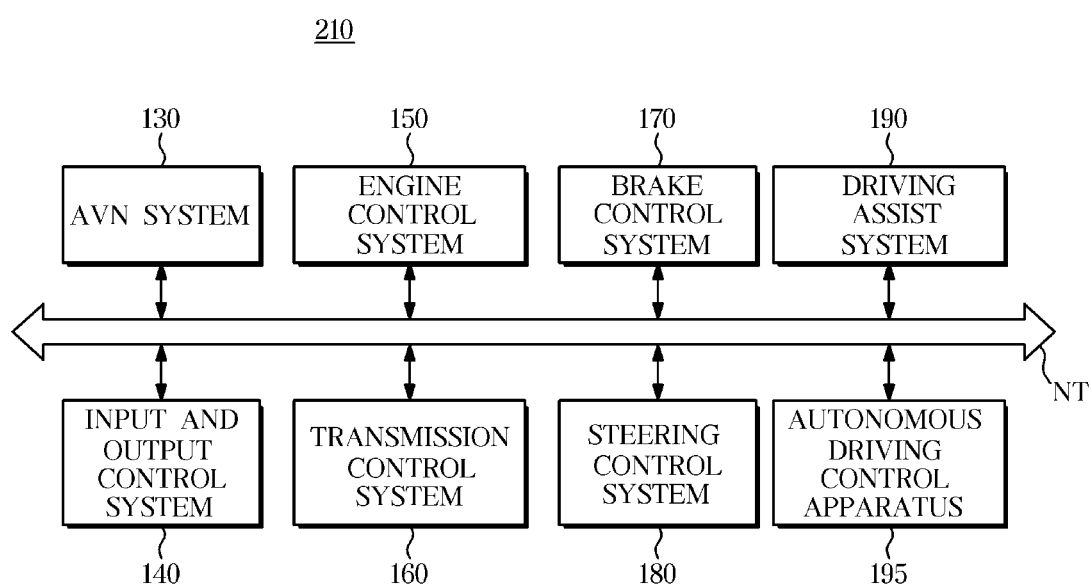
FIG. 3 is a schematic diagram illustrating a variety of electronic apparatuses of the vehicle in which the autonomous driving control apparatus in accordance with embodiments of the present disclosure is provided.

For example, FIG. 3 is a schematic diagram illustrating a variety of electronic apparatuses of the vehicle 100 in which the autonomous driving control apparatus in accordance with embodiments of the present disclosure is provided.

As shown in FIG. 3, a variety of ECUs 210 included in the vehicle 100 may communicate with one another through a communication network NT for a vehicle. The communication network NT for a vehicle may employ communication protocols such as media oriented systems transport (MOST) having a maximum communication speed of 24.5 megabits per second (Mbps), FlexRay having a maximum communication speed of 10 Mbps, CAN having a communication speed of 125 kilobits per second (kbps) to 1 Mbps, LIN having a communication speed of 20 kbps, and the like. The above-described communication network NT may employ not only one of communication protocols such as MOST, FlexRay, CAN, LIN, and the like but also a plurality of communication protocols.

Also, the vehicle 100 may further include a variety of ECUs in addition to the variety of ECUs 210 shown in FIG. 3.

For example, an AVN system 130 is a device which outputs music or video according to a control command of a driver. In detail, the AVN system 130 may play music or video or may guide a path to a destination according to a control command of a driver.

For example, an input and output control system 140 receives a control command of a driver through a button and displays information corresponding to a control command of a driver. The input and output control system 140 may include a cluster display provided on a dashboard to display a vehicular speed, an engine speed, a refueling amount, transmission overheated state information, and the like, a wheel button module installed on a steering wheel, and the like.

For example, an engine control system 150 controls fuel injection, mileage feedback, lean-burn, ignition time, and idle revolutions per minute, and the like. The engine control system 150 may not be only a single device but also a plurality of devices connected through communication.

For example, a transmission control system 160 controls a shifting point, a damper clutch, a pressure at turning on/off a friction clutch, and engine torque during transmission, and the like. The transmission control system 160 may be not only a single device but also a plurality of devices connected through communication.

For example, a brake control device 170 may control a brake of a vehicle 100 and may, representatively, include an antilock brake system (ABS) and the like.

For example, a steering control device 180 assists a driver in manipulating of steering by a driver by reducing a steering force in low-speed driving or parking and increasing the steering force in high-speed driving.

For example, a driving assist system 190 may assist driving of the vehicle 1 and may perform a forward collision avoidance function, a lane departure warning (LDW) function, a blind spot detection (BSD) function, a rearward monitoring function, and the like.

For example, the driving assist system 190 may include a plurality of devices connected through communication. For example, the driving assist system 190 may include a forward collision warning (FCW) system, an advanced emergency braking system (AEBS), an adaptive cruise control (ACC) system, an LDW system (LDWS), a lane keeping assist system (LKAS), a BSD system, a rear-end collision warning (RCW) system, and the like.

Also, although not shown in the drawings, the ECU 210 included in a vehicle may further include an external lamp control device so as to turn on or off a variety of lamps included in the vehicle and adjust brightness.

Also, an autonomous driving control apparatus 195 in accordance with one embodiment of the present disclosure may also be included.

In the above, a variety of components of a vehicle including the autonomous driving control apparatus have been described.

Hereinafter, an operation of the vehicle will be described in detail.

As an example, FIG. 4 is a view exemplarily illustrating an alternative function performance determining method when one ECU is an external lamp controller.

The external lamp controller is one of the plurality of ECUs included in the vehicle 100 and is assumed to be a second ECU 212 which will be described in FIG. 4. Also, as assumed above, the first ECU 211 is assumed to be an autonomous driving control apparatus.

Accordingly, the autonomous driving control apparatus 211 may include the first controller 211a controlling, as a whole, the autonomous driving control apparatus 211 and the first storage 211b in which a variety of processors and the like are stored. Also, although not shown in the drawings, the autonomous driving control apparatus 211 may include a first communicator which performs communication with another ECU 210 or the CCU 230 of the vehicle.

Also, the external lamp controller 212 may include a second controller 212a controlling, as a whole, the external lamp controller 212 and a second storage 212b in which a variety of processors and the like are stored. Also, although not shown in the drawings, the external lamp controller 212 may include a second communicator which performs communication with another ECU 210 or the CCU 230 of the vehicle.

Lamps of the vehicle controlled by the second controller 212a of the external lamp controller 212 may include brake lamps, tail lamps, daytime running lights (DRL), and cornering lamps.

Here, the first controller 211a of the first ECU 211 diagnoses a state of each lamp of the external lamp controller and may determine whether autonomous driving is possible according to a state of each lamp. Also, the first controller 211a of the first ECU 211 may transmit a diagnosed state of each lamp to the CCU 230 through a network of the vehicle and the CCU 230 may transmit corresponding information to the server 250.

As an example, when the first controller 211a of the first ECU 211 diagnoses a state of brake lamps and the state of brake lamps is diagnosed to be normal as a diagnosis result, it is determined that autonomous driving is possible. Accordingly, the corresponding information is transmitted to the server 250 through the CCU 230 but the server 250 only receives the corresponding information and it is unnecessary to determine whether to perform an alternative function.

Also, as an example, when the first controller 211a of the first ECU 211 diagnoses a state of tail lamps and the tail lamps are diagnosed to be abnormal due to disconnection (a "first failure code"), it is determined that it is necessary to set an alternative function of autonomous driving. Accordingly, the corresponding information is transmitted to the server 250 through the CCU 230 and the server 250 provides the vehicle 100 with information with respect to a component to be operated instead of the tail lamps. Here, when a plurality of components are to be operated instead of the tail lamps, information on priority thereof may also be provided. For example, information on "operating flasher lamps as priority 1" and "operating fog lamps as priority 2" among components to be operated, instead of the tail lamps, may be provided.

Also, as an example, when the first controller 211a of the first ECU 211 diagnoses a state of the DRL, and the DRL are diagnosed to be abnormal due to a short-circuit (a "second failure code"), it is determined that it is necessary to set an alternative function of autonomous driving. Accordingly, the corresponding information is transmitted to the server 250 through the CCU 230 and the server 250 provides the vehicle 100 with information with respect to a component to be operated instead of the DRL. Here, when a plurality of components are to be operated instead of the DRL, information on priority thereof may also be provided. For example, information on "operating head lamps upward as priority 1" and "operating fog lamps as priority 2" among components to be operated instead of the DRL may be provided.

Also, as an example, when the first controller 211a of the first ECU 211 diagnoses a state of the cornering lamps and the cornering lamps are diagnosed to be abnormal as a particular Nth failure code, it is determined that it is necessary to set an alternative function of autonomous driving. Accordingly, the corresponding information is transmitted to the server 250 through the CCU 230, and the server 250 provides the vehicle 100 with information with respect to a component to be operated instead of the cornering lamps. Here, when a component to be operated instead of the cornering lamps is not present, the first controller 211a may provide information that an alternative component is not present and a determination result that autonomous driving is possible when the autonomous driving is possible without an alternative component.

That is, the first controller 211a of the first ECU 211 may confirm, through communication with the server 250, whether components (e.g., the brake lamps, the tail lamps, and the DRL) need alternative functions selected therefor or components (e.g., the cornering lamps) are impossible to select alternative functions therefor but are optionally necessary for starting autonomous driving.

Accordingly, diagnosis information of the first controller 211a of the first ECU 211 may be transmitted to and stored in the cloud server 250, and a command with respect to performing an alternative function may be executed through communication-based message update.

Accordingly, FIG. 4 illustrates embodiments with respect to a method of confirming whether to perform an alternative function and confirming whether driving is possible through diagnosis information before driving of the vehicle 100.

Next, FIG. 5 illustrates embodiments with respect to a method of determining whether to perform an alternative function and whether to continue driving through diagnosis information during driving of the vehicle 100. However, when it is not possible to perform an alternative function through the diagnosis information during driving, it may be determined that autonomous driving is impossible.

As an example, FIG. 5 is a view exemplarily illustrating an alternative function performance determining method when one ECU is a brake controller.

The brake controller is one of the plurality of ECUs included in the vehicle 100 and is assumed as a third ECU 213 in FIG. 5 which will be described. Also, as assumed above, the first ECU 211 is assumed to be the autonomous driving control apparatus.

Accordingly, the autonomous driving control apparatus 211 may include the first controller 211a controlling, as a whole, the autonomous driving control apparatus 211, the first storage 211b in which a variety of processors and the like are stored, and although not shown in the drawings, a first communication unit which performs communication with another ECU 210 or the CCU 230 of the vehicle.

Also, the brake controller 213 may include a third controller 213a controlling, as a whole, the brake controller 213 and a third storage 213b in which a variety of processors and the like are stored. Also, although not shown in the drawings, the brake controller 213 may include a third communication unit which performs communication with another ECU 210 or the CCU 230 of the vehicle.

Functions of the vehicle controlled by the third controller 213a of the brake controller 213 may include controlling a brake and a slip and more functions may be performed in addition thereto.

Here, the first controller 211a of the first ECU 211 diagnoses each control function of the brake controller and may determine whether autonomous driving is possible according to an operation of each control function. Also, the first controller 211a of the first ECU 211 may transmit a diagnosed state of each control function to the CCU 230 through the network of the vehicle and the CCU 230 may transmit corresponding information to the server 250.

As an example, when the first controller 211a of the first ECU 211 determines brake performance to be deteriorated and abnormal, it is determined that it is necessary to set an alternative function of autonomous driving. Accordingly, the corresponding information is transmitted to the server 250 through the CCU 230 and the server 250 provides the vehicle 100 with information with respect to a component to be operated instead of the brake controller. Here, when a plurality of components are to be operated instead of the brake controller, information on priority thereof may also be provided.

For example, when a braking of the brake is insufficient in comparison to a target value due to performance deterioration, information on "operating a parking brake as priority 1," "accelerating as priority 2," and "controlling the engine as priority 3" may be provided as an alternative function for speed reduction.

Here, according to the provided priority, it is possible for the vehicle 100 to sequentially control a plurality of functions at the same time. When the braking is insufficient in comparison to the target value after performing a plurality of such alternative functions, a driver may receive a warning of a state in which autonomous driving is impossible and the vehicle 100 may be forced to change to a driving mode selected by a driver of the vehicle 100.

Also, as an example, when the first controller 211a of the first ECU 211 diagnoses a state of slip control and a result of diagnosis is that the state of slip control is diagnosed to be normal, it is determined that autonomous driving is possible. Accordingly, the corresponding information is transmitted to the server 250 through the CCU 230, but the server 250 only receives the corresponding information, and it is unnecessary to determine whether to perform an alternative function.

That is, as in embodiments shown in FIG. 5, when it is possible to determine whether autonomous driving is controllable in driving and driving starts, the vehicle 100 and the server 250 determine whether autonomous driving is possible and whether an alternative function is settable. Unlike a determination of controlling autonomous driving before driving, when autonomous driving control is determined after driving, autonomous driving is controllable only when autonomous driving corresponding to a predetermined target value (a threshold) is controllable. When the vehicle 100 provides a variety of alternative functions which do not reach the target value, it is necessary to change to the driving mode selected by the driver of the vehicle 100.

Accordingly, a variety of embodiments of controlling autonomous driving according to settings of alternative functions obtained from the server on the basis of information of a variety of ECUs 210 diagnosed by the autonomous driving control apparatus have been described above.

Hereinafter, general methods of determining whether autonomous driving of the vehicle 100 including the autonomous driving control apparatus is possible and controlling setting of an alternative function will be described.

Figure 6:
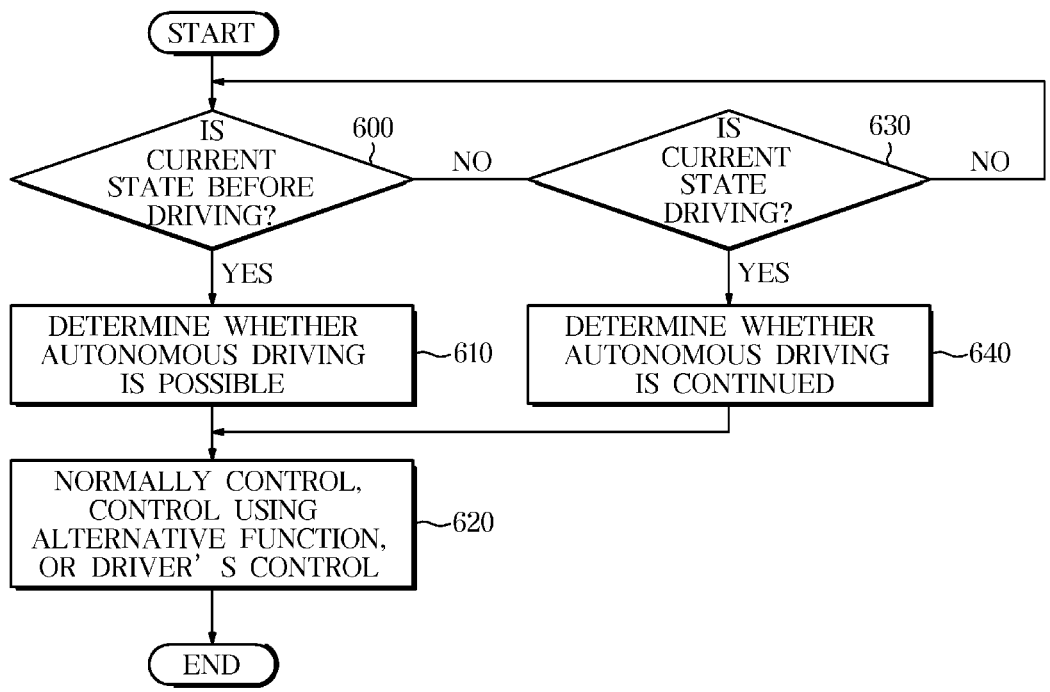
FIG. 6 is a flowchart illustrating a method of controlling autonomous driving of a vehicle including the autonomous driving control apparatus.

First, FIG. 6 is a flowchart illustrating a method of controlling autonomous driving of a vehicle including the autonomous driving control apparatus.

As shown in FIG. 6, the autonomous driving control apparatus 195 in accordance with embodiments of the present disclosure determines whether autonomous driving is possible or whether to continue autonomous driving depending on whether a current state of the vehicle 100 is before driving (600) or during driving (630).

In detail, when the current state of the vehicle 100 is before driving of the vehicle 100 (YES in 600), the autonomous driving control apparatus 195 determines whether autonomous driving is possible with respect to the plurality of ECUs 210 included in the vehicle (610). Here, whether the current state of the vehicle 100 is before driving of the vehicle refers to a case in which the vehicle stops while being started.

When the vehicle is driving (YES in 630), whether autonomous driving continues with respect to the plurality of ECUs 210 included in the vehicle is determined (640). Here, whether the vehicle is driving may include a case in which a speed of the vehicle is greater than or equal to a threshold.

Afterwards, the autonomous driving control apparatus 195 performs normal control, control through an alternative function, or driver control on the basis of the result of determining whether autonomous driving is possible (610) or the result of determining whether autonomous driving is continued (640) (620).

Figure 7:
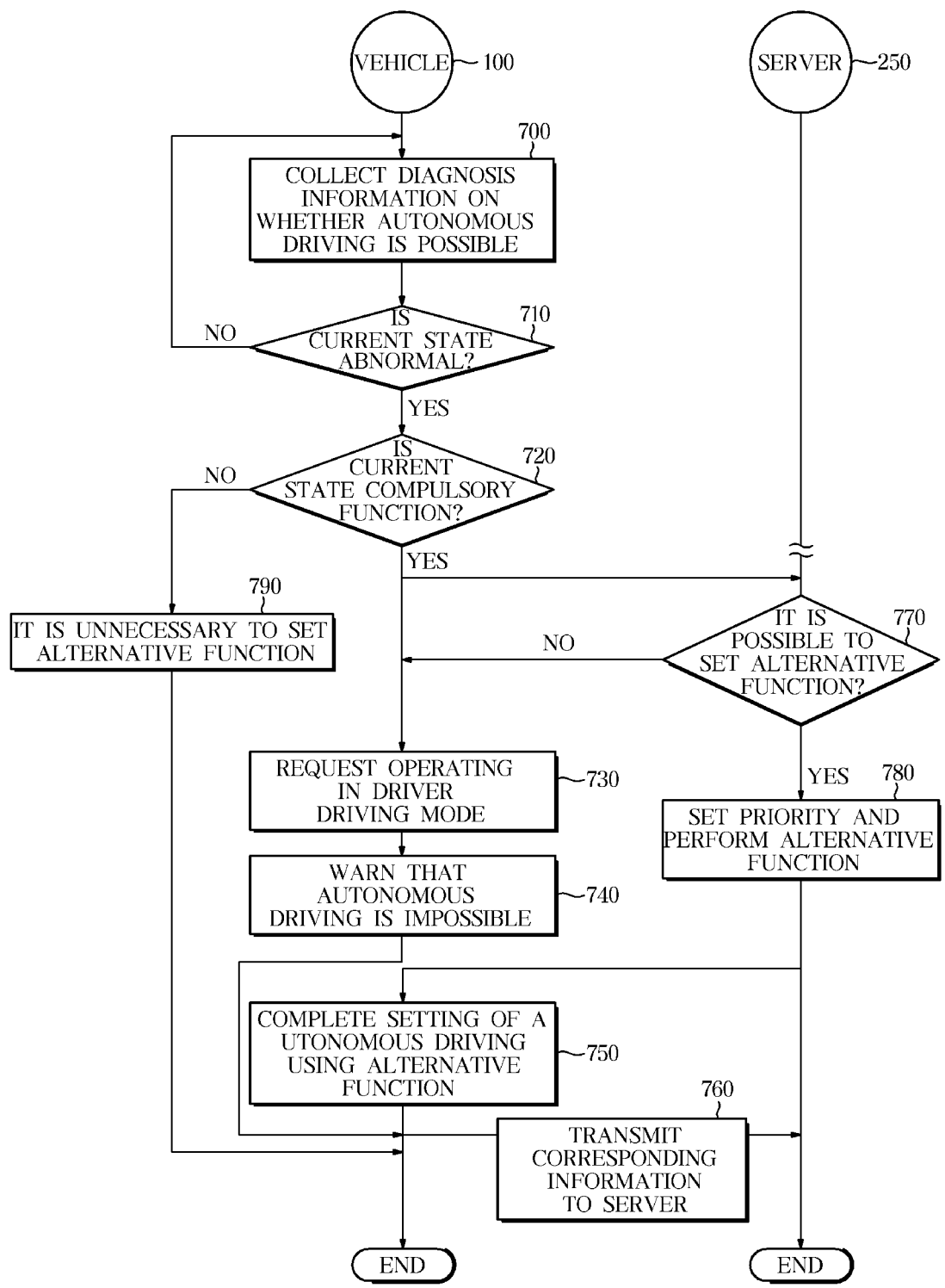
FIGS. 7 and 8 are flowcharts illustrating a method of controlling autonomous driving of a vehicle including the autonomous driving control apparatus and a server.
Figure 8:
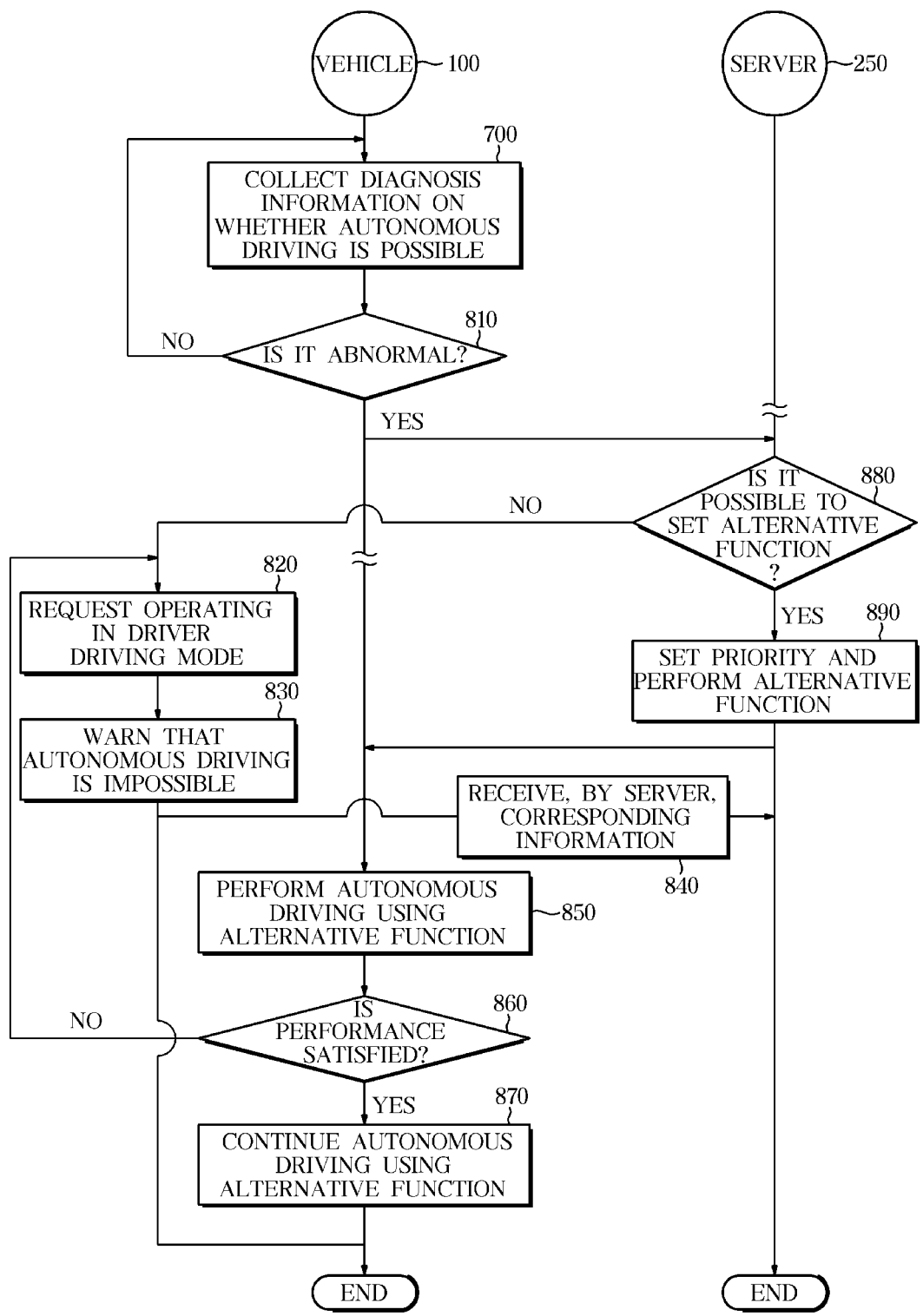

FIGS. 7 and 8 are flowcharts illustrating a method of controlling autonomous driving of a vehicle including the autonomous driving control apparatus and a server. Particularly, FIG. 7 is a flowchart illustrating a method of determining whether autonomous driving is possible in a state before the vehicle is driven, and FIG. 8 is a flowchart illustrating a method of determining whether autonomous driving is continuable in a state while the vehicle is driven.

First, as shown in FIG. 7, the vehicle 100 collects diagnosis information on whether autonomous driving is possible (700). In detail, the autonomous driving control apparatus 195 included in the vehicle 100 may collect diagnosis information with respect to the plurality of ECUs 210.

Here, when the diagnosis information collected from a particular one of the ECUs 210 is abnormal (YES in 710) and a corresponding function determined to be abnormal is a compulsory function (YES in 720), corresponding information is transmitted to the server 250. Here, the vehicle 100 may transmit the corresponding information to the server 250 through the CCU 230.

Although a subject which determines whether a function is compulsory is shown as the vehicle 100 in FIG. 7, according to circumstances, a subject which determines whether a compulsory function is determined to be abnormal may be the server 250.

Accordingly, when the server 250 determines whether the corresponding function determined to be abnormal is settable on the basis of received diagnosis information and the alternative function is settable (YES in 770), priorities of a plurality of alternative functions capable of being performed are set, and corresponding information is transmitted to the vehicle to perform an alternative function. Likewise, the server 250 may transmit the corresponding information to the vehicle 100 through the CCU 230. Accordingly, the vehicle 100 may complete setting of autonomous driving with an alternative function including priority (750) and, lastly, may transmit corresponding set information to the server 250.

When the server 250 determines whether it is possible to set an alternative function of the corresponding function determined to be abnormal on the basis of the received diagnosis information and it is not possible to set an alternative function (NO in 770), corresponding information may be transmitted to the vehicle 100 and the vehicle 100 may request operating in a driving mode selected by a driver of the vehicle 100 (730) and may display a warning stating that autonomous driving is impossible to a driver (740) at the same time.

Next, as shown in FIG. 8, the vehicle 100 collects diagnosis information on whether autonomous driving is possible in driving (800). The ECU 210, with respect to which the vehicle 100 collects diagnosis information on whether autonomous driving is possible during driving, may correspond to a driving controller configured to control a driving operation of the vehicle or a brake controller configured to control a braking operation of the vehicle, but is not limited thereto.

Here, when the diagnosis information collected from a particular one of the ECUs 210 is abnormal (YES in 810), corresponding information is transmitted to the server 250. The server 250, which receives the information, determines whether an alternative function of the corresponding function determined to be abnormal on the basis of the received diagnosis information is settable. When the alternative function is settable (YES in 880), the server 250 sets priority with respect to the plurality of alternative functions capable of being performed and transmits the corresponding information to the vehicle 100 to perform the alternative function (890).

Accordingly, the vehicle 100 performs autonomous driving through an alternative function including priority (850).

However, when performance of the vehicle 100 is not satisfiable while autonomous driving is performed using the alternative function (NO in 860), the vehicle 100 may request for an operation in the driving mode selected by the driver of the vehicle 100 (820) and may display a warning stating that autonomous driving is impossible to a driver (830).

As is apparent from the above description, it may be determined whether it is possible to control autonomous driving of a vehicle without driver intervention by autonomously determining states of a plurality of ECUs present in the vehicle.

Also, a vehicle may be provided which is capable of autonomous driving without driver intervention by automatically determining states of a plurality of ECUs equipped in the vehicle.

Also, a vehicle may be provided which is capable of being autonomously driven without driver intervention by automatically diagnosing a plurality of ECUs and performing an alternative control on the basis of diagnostic information.

Therefore, a vehicle may be provided which is capable of safely controlling autonomous driving without driver intervention.

Although certain embodiments of the present disclosure have been shown and described, it would be appreciated by those skilled in the art that changes may be made in these embodiments without departing from the principles and spirit of the disclosure, the scope of which is defined in the claims and their equivalents. The disclosed embodiments are exemplary and should not be interpreted to limit the scope of the present disclosure.

What is claimed is:

1. An autonomous driving control apparatus for a vehicle comprising:
   a communication control unit (CCU) configured to communicate with at least one electronic control unit (ECU) included in the vehicle and an external server; and
   a controller configured to diagnose the at least one ECU, to transmit a result of the diagnosis of the at least one ECU to the external server through the CCU, to receive alternative function information, indicating one or more alternative functions, generated by the external server based on the result of the diagnosis of the at least one ECU, and to perform autonomous driving control of the vehicle using the one or more alternative functions.

2. The autonomous driving control apparatus of claim 1, wherein the controller is configured to determine whether autonomous driving of the at least one ECU is possible before the vehicle is driven, and to determine whether the autonomous driving of the at least one ECU continues while the vehicle is driven.

3. The autonomous driving control apparatus of claim 2, wherein, when the at least one ECU is diagnosed to be abnormal before the vehicle is driven, the controller is configured to determine whether autonomous driving of the vehicle is possible using a function included in the one or more alternative functions.

4. The autonomous driving control apparatus of claim 2, wherein, when the at least one ECU is diagnosed to be abnormal before the vehicle is driven and a compulsory function of the at least one ECU is determined to be abnormal, the controller is configured to request an operation in a driving mode selected by a driver of the vehicle.

5. The autonomous driving control apparatus of claim 2, wherein, when the at least one ECU is diagnosed to be abnormal while the vehicle is driven, the controller is configured to determine whether autonomous driving of the vehicle is possible using a function included in the one or more alternative functions.

6. The autonomous driving control apparatus of claim 5, wherein the at least one ECU includes a driving controller configured to control a driving operation of the vehicle or a brake controller configured to control a braking operation of the vehicle.

7. The autonomous driving control apparatus of claim 5, wherein the controller is configured to determine whether a preset target performance is satisfied while the autonomous driving of the vehicle is performed using the function included in the one or more alternative functions, and to request operation of the vehicle in a driving mode selected by a driver of the vehicle when the preset target performance is not satisfied.

8. The autonomous driving control apparatus of claim 5, wherein, when the alternative function information includes a plurality of prioritized alternative functions, the controller is configured to sequentially apply the plurality of prioritized alternative functions to satisfy a preset target performance.

9. A vehicle comprising:
   a communication control unit (CCU) configured to communicate with at least one electronic control unit (ECU) included in the vehicle and an external server; and
   an autonomous driving control apparatus configured to diagnose the at least one ECU, to transmit a result of the diagnosis of the at least one ECU to the external server through the CCU, to receive alternative function information, indicating one or more alternative functions, generated by the external server based on the result of the diagnosis of the at least one ECU, and to perform autonomous driving control of the vehicle using the one or more alternative functions.

10. The vehicle of claim 9, wherein the autonomous driving control apparatus is configured to determine whether autonomous driving of the at least one ECU is possible before the vehicle is driven, and to determine whether the autonomous driving of the at least one ECU continues while the vehicle is driven.

11. The vehicle of claim 10, wherein, when the at least one ECU is diagnosed to be abnormal before the vehicle is driven, the autonomous driving control apparatus is configured to determine whether autonomous driving of the vehicle is possible using a function included in the one or more alternative functions.

12. The vehicle of claim 10, wherein, when the at least one ECU is diagnosed to be abnormal before the vehicle is driven and a compulsory function of the at least one ECU is determined to be abnormal, the autonomous driving control apparatus is configured to request an operation in a driving mode selected by a driver of the vehicle.

13. The vehicle of claim 12, wherein, when the at least one ECU is diagnosed to be abnormal while the vehicle is driven, the autonomous driving control apparatus is configured to determine whether autonomous driving of the vehicle is possible using a function included in the one or more alternative functions.

14. The vehicle of claim 13, wherein the at least one ECU includes a driving controller configured to control a driving operation of the vehicle or a brake controller configured to control a braking operation of the vehicle.

15. The vehicle of claim 13, wherein the autonomous driving control apparatus is configured to determine whether a preset target performance is satisfied while the autonomous driving of the vehicle is performed using the function included in the one or more alternative functions, and to request operation of the vehicle in a driving mode selected by a driver of the vehicle when the preset target performance is not satisfied.

16. The vehicle of claim 13, wherein, when the alternative function information includes a plurality of prioritized alternative functions, the autonomous driving control apparatus is configured to sequentially apply the plurality of prioritized alternative functions to satisfy a preset target performance.

17. A method of controlling a vehicle, comprising:
   establishing, by a communication control unit (CCU) of the vehicle, a communication session with at least one electronic control unit (ECU) included in the vehicle and an external server;
   diagnosing, by a controller of the vehicle, the at least one ECU;
   transmitting, via the CCU, a result of the diagnosis of the at least one ECU to the external server;
   receiving, via the CCU, alternative function information, indicating one or more alternative functions, generated by the external server based on the result of the diagnosis of the at least one ECU; and performing, by the controller, autonomous driving control of the vehicle using the one or more alternative functions.

18. The method of claim 17, wherein the diagnosing of the at least one ECU comprises:
    determining, by the controller, whether autonomous driving of the at least one ECU is possible before the vehicle is driven; and
    determining, by the controller, whether the autonomous driving of the at least one ECU continues while the vehicle is driven.

19. The method of claim 18, further comprising, when the at least one ECU is diagnosed to be abnormal before the vehicle is driven and a compulsory function of the at least one ECU is determined to be abnormal, requesting, by the controller, an operation in a driving mode selected by a driver of the vehicle.

20. The method of claim 18, further comprising, when the at least one ECU is diagnosed to be abnormal while the vehicle is driven, determining, by the controller, whether autonomous driving of the vehicle is possible using a function included in the one or more alternative functions.

21. The method of claim 18, further comprising:
    determining, by the controller, whether a preset target performance is satisfied while the autonomous driving of the vehicle is performed using the function included in the one or more alternative functions; and
    requesting, by the controller, operation of the vehicle in a driving mode selected by a driver of the vehicle when the preset target performance is not satisfied.

22. The method of claim 18, further comprising, when the alternative function information includes a plurality of prioritized alternative functions, sequentially applying, by the controller, the plurality of prioritized alternative functions to satisfy a preset target performance.

* * * * *